US009253487B2

(12) United States Patent
Seregin et al.

(10) Patent No.: US 9,253,487 B2
(45) Date of Patent: Feb. 2, 2016

(54) REFERENCE INDEX FOR ENHANCEMENT LAYER IN SCALABLE VIDEO CODING

(71) Applicant: QUALCOMM Incorporated, San Diego, CA (US)

(72) Inventors: Vadim Seregin, San Diego, CA (US); Xianglin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 13/904,336

(22) Filed: May 29, 2013

(65) Prior Publication Data

US 2013/0322538 A1 Dec. 5, 2013

Related U.S. Application Data

(60) Provisional application No. 61/653,984, filed on May 31, 2012, provisional application No. 61/681,115, filed on Aug. 8, 2012, provisional application No. 61/707,751, filed on Sep. 28, 2012, provisional application No. 61/707,875, filed on Sep. 28, 2012.

(51) Int. Cl.
*H04N 7/12* (2006.01)
*H04N 13/00* (2006.01)
(Continued)

(52) U.S. Cl.
CPC ....... *H04N 19/00569* (2013.01); *H04N 19/196* (2014.11); *H04N 19/30* (2014.11);
(Continued)

(58) Field of Classification Search
CPC ...... H04N 7/18; H04N 5/23241; H04N 5/232
See application file for complete search history.

(56) References Cited

U.S. PATENT DOCUMENTS

2008/0175496 A1* 7/2008 Segall .................... G06T 5/009
382/238
2009/0190658 A1 7/2009 Park et al.
(Continued)

FOREIGN PATENT DOCUMENTS

WO WO-2008047316 A1 4/2008
WO 2012091640 A1 7/2012

OTHER PUBLICATIONS

Bici O., et al., "Description of Scalable Video Coding Technology Propasal by Nokia (encoder configuration 1)", 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/no.jvtcv-k0040, Oct. 1, 2012, XP030112972, pp. 1-13.
(Continued)

*Primary Examiner* — Dave Czekaj
*Assistant Examiner* — Tsion B Owens
(74) *Attorney, Agent, or Firm* — Knobbe Martens Olson & Bear LLP

(57) ABSTRACT

An apparatus for coding video information according to certain aspects includes a memory unit and a processor in communication with the memory unit. The memory unit stores video information of a base, or reference, layer and an enhancement layer. The processor determines whether a base layer reference index is valid for the enhancement layer, and resolves mismatches between base layer and enhancement layer reference indices and reference frame picture order counts. Resolving mismatches may comprise deriving valid reference information from the base layer, using spatial motion information of video data associated with the reference information of the base and/or enhancement layers.

62 Claims, 6 Drawing Sheets

(51) Int. Cl.
H04N 19/50 (2014.01)
H04N 19/52 (2014.01)
H04N 19/70 (2014.01)
H04N 19/30 (2014.01)
H04N 19/196 (2014.01)
H04N 19/593 (2014.01)
H04N 19/597 (2014.01)

(52) U.S. Cl.
CPC .............. *H04N 19/50* (2014.11); *H04N 19/52* (2014.11); *H04N 19/593* (2014.11); *H04N 19/70* (2014.11); *H04N 19/597* (2014.11)

(56) References Cited

U.S. PATENT DOCUMENTS

| | | | |
|---|---|---|---|
| 2009/0207919 | A1 | 8/2009 | Yin et al. |
| 2012/0314769 | A1 | 12/2012 | Lee et al. |
| 2013/0064284 | A1 | 3/2013 | Samuelsson et al. |
| 2014/0003527 | A1* | 1/2014 | Tourapis .......... H04N 19/00424 375/240.16 |
| 2014/0092970 | A1* | 4/2014 | Misra ................ H04N 19/52 375/240.16 |
| 2014/0092971 | A1* | 4/2014 | Misra ................ H04N 19/503 375/240.16 |
| 2014/0133567 | A1* | 5/2014 | Rusanovskyy ....... H04N 19/159 375/240.16 |

OTHER PUBLICATIONS

Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d2, 290 pp.

Chen J., et al., "Description of Scalable Video coding Technology Proposal by Qualcomm (Configuration 2)", 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-T SG.16); < URL: http://wftp3.itu.int/av-arch/jctvc-site/no.jvtcv-k0036 >, Oct. 2, 2012, XP030112968, pp. 1-22.

Chen J., et al., "SHVC Draft Text 1", Joint Collaborative Team on Video Coding (JCT-VC) of ITU-T SG16 WP3 and ISO/IEC JTC1/SC29/WG11 12th Meeting: Geneva, CH, JCTVC-L1008, Jan. 14-23, 2013; pp. 1-33.

Chen J. et al., "MVP index parsing with fixed number of candidates", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16); URL: http://wftp3.itu.int/av-arch/jctvc-site/ No. JCTVC-F402, Jul. 12, 2011, XP030009425; 1-14.

Hong D. et al., "Scalability Support in HEVC," Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F290, pp. 1-15.

International Search Report and Written Opinion—PCT/US2013/043412—ISA/EPO—Sep. 4, 2013.

Kim C., et al., "Description of scalable video coding technology proposal by LG Electronics and MediaTek (differential coding mode on)", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/,, No. JCTVC-K0033, Oct. 1, 2012, XP030112965, section 2.3.3 "Inter-layer motion vector prediction"; pp. 1-38.

Schwarz et al., "Description of 3D Video Coding Technology Proposal by Fraunhofer HHI (HEVC compatible, configuration B)", 98. MPEG Meeting; Nov. 28, 2011-Dec. 2, 2011; Geneva; (Motion Picture Expert Group or ISO/IEC JTC1/SC29/WG11), No. m22571, Nov. 22, 2011, XP030051134; 46 pages.

Schwarz et al., "Further experiments for an MCTF extension of H.264", 23. VCEG Meeting; 69. MPEG Meeting; Jul. 17, 2004-Jul. 23, 2004; Redmond, WA, US; (Video Coding Experts Group of ITU-TSG.16), No. VCEG-W06, Jul. 15, 2004, XP030003415, ISSN: 0000-0454 figure 4 section 2 .1.1 "Inter-layer prediction of motion data"; pp. 1-7.

Tech G., et al., "MV-HEVC Draft Text 3 (ISO/IEC 23008-2:201x/PDAM2", Joint Collaborative Team on 3D Video Coding Extension Development of ITU-T SG 16 WP 3 and ISO/IEC JTC1/SC 29/WG 11 3rd Meeting: Geneva, CH , JCT3V-C1004, Jan. 17-23, 2013; pp. 1-30.

* cited by examiner

REFERENCE INDEX FOR ENHANCEMENT LAYER IN SCALABLE VIDEO CODING

CROSS-REFERENCE TO RELATED APPLICATIONS

This application claims priority under 35 U.S.C. §119(e) to U.S. Provisional Application No. 61/653,984, entitled "REFERENCE INDEX FOR ENHANCEMENT LAYER IN SCALABLE VIDEO CODING" and filed on May 31, 2012, to U.S. Provisional Patent Application No. 61/681,115, entitled "REFERENCE INDEX FOR ENHANCEMENT LAYER IN SCALABLE VIDEO CODING" and filed on Aug. 8, 2012, to U.S. Provisional Patent Application No. 61/707,751, entitled "REFERENCE INDEX FOR ENHANCEMENT LAYER IN SCALABLE VIDEO CODING" and filed on Sep. 28, 2012, and to U.S. Provisional Patent Application No. 61/707,875, entitled "REFERENCE INDEX FOR ENHANCEMENT LAYER IN SCALABLE VIDEO CODING" and filed on Sep. 28, 2012, each of which are hereby incorporated by reference in their entireties.

TECHNICAL FIELD

This disclosure relates to video coding and compression and, in particular, to scalable video coding (SVC).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which may be quantized. The quantized transform coefficients may be initially arranged in a two-dimensional array, and scanned in order to produce a one-dimensional vector of transform coefficients, and entropy coding may be applied to achieve even more compression.

SUMMARY

The systems, methods and devices of this disclosure each have several innovative aspects, no single one of which is solely responsible for the desirable attributes disclosed herein.

In general, this disclosure describes techniques related to scalable video coding (SVC). Coding used herein refers to encoding or decoding. One embodiment relates to a method of encoding or decoding video data in a scalable video coding scheme that defines at least one base layer and at least one enhancement layer. The video data may comprise a base layer and an enhancement layer. The base layer may comprise a base layer block. The enhancement layer may comprise an enhancement layer block. The base layer block may be located at a position in the base layer corresponding to a position of the enhancement layer block in the enhancement layer. A co-located block is a block in the base layer associated with a current block in the enhancement layer. A base layer and an enhancement layer include reference information used for coding video data. Reference information for a layer (e.g, a base layer, an enhancement layer, a relative layer, or any layer used in a scalable video coding scheme) may include, for example, motion information (e.g., motion vectors and/or motion vector candidates), reference frames, a reference index (also referred to as a reference frame index), one or more reference lists, and reference frame information including picture order count (POC) information. Thus for example, reference information for a first layer (e.g. a base layer) may be used to code a second layer (e.g. an enhancement layer). A reference index may be associated with a block in a layer.

In some instances, a reference index of a co-located block in the first layer may be invalid relative to reference information of the second layer. Thus, according to one embodiment, the method may include determining whether the reference index of a co-located block in a first layer is invalid relative to reference information associated with a second layer. As used in this disclosure, determining whether reference information for a co-located block in the first layer is invalid relative to a second layer may also comprise, for example, determining whether these is a mismatch between reference information of an enhancement layer relative to reference information of a base layer, and if there is a mismatch, resolving the mismatch. Resolving mismatches may comprise deriving or determining valid reference information from the co-located block in the first layer (e.g. base) layer, using spatial motion information of video data associated with the first (e.g. base) and/or second (e.g. enhancement) layers. In some embodiments, deriving valid reference information may comprise modifying reference information from the co-located block in the first layer to be valid for the second layer.

For example, the method can use a spatial motion vector candidate in the enhancement layer block to determine or modify reference information derived from the co-located block in the base layer. The method can further include, if there is not a mismatch, using at least some of the reference information of the co-located block in the base layer to code the corresponding block in the enhancement layer in accordance with a merge mode coding technique or an advanced motion vector prediction (AMVP) coding technique, such as in particular as a motion vector candidate coding technique. In some embodiments, determining whether there is a mismatch includes determining whether a reference index of the co-located block in a base layer is valid for the enhancement layer block. In some embodiments, determining whether there is a mismatch comprises determining there is no frame in the enhancement layer reference frame list having the same picture order count (POC) values as one or more base layer picture order count (POC) values. In some embodiments, determining whether there is a mismatch includes determining whether a reference index of the co-located block in a base layer is valid for the enhancement layer block, and determining whether one or more base layer picture order count (POC) values are valid for the enhancement layer.

In some embodiments, a method of decoding and/or encoding video data includes, resolving a mismatch by determining a reference index for a base layer motion vector candidate using information from a spatial motion vector candidate in the enhancement layer. Determining the reference index can further include applying scaling to the base layer motion vector candidate. In some embodiments, using information from a spatial motion vector candidate in the enhancement layer can include checking two or more enhancement layer spatial motion vector candidates one by one and using the information from one of the evaluated spatial motion vector candidates. In some embodiments, the method can further include checking the two or more enhancement layer spatial motion candidates in a predefined order. The method can further include using first available reference information of the enhancement layer spatial motion candidates. In some embodiments of the method, resolving the mismatch includes using two or more techniques to resolve the mismatches. In some embodiments of the method the two or more techniques include at least one of: searching reference frame picture order count in the enhancement layer corresponding to the base layer reference index or equal to the reference frame POC of the base layer associated with the base layer reference index and if found the reference index is assigned to the base layer motion vector candidate, if not found setting the reference index to a predefined value (e.g. zero), and setting a direction (e.g., L0 or L1) as unavailable making the base layer candidate uni-directional if it was bi-directional initially or making the base layer motion vector candidate completely unavailable if it was uni-directional initially. In general motion information associated with a first layer (e.g. a base layer or an enhancement layer) can include one or more motion vector candidates which may be used for prediction or coding of a second layer.

In another embodiment, a computer readable storage medium includes instructions executable by a processor of an apparatus, the instructions causing the apparatus to determine whether these is a mismatch between reference information of an enhancement layer relative to reference information of a base layer, and if there is a mismatch, resolve the mismatch by using reference information of a motion vector in the enhancement layer to determine reference information of the base layer.

In another embodiment, an apparatus configured to encode and/or decode media information in a scalable video coding scheme that defines at least one base layer and at least one enhancement layer includes a memory unit configured to store picture of video information comprising at least one pictures, and a processor operationally coupled to the memory. The processor is configured to retrieve the information from the memory and code the information. The processor is further configured to determine whether there is a mismatch between reference information of an enhancement layer relative to reference information of a base layer, and if there is a mismatch, resolve the mismatch by using reference information to spatial motion information of video data in the enhancement layer to determine or substitute reference information of the base layer.

In another embodiment, a device that encodes and/or decodes video data in a scalable video coding scheme that defines at least one base layer and at least one enhancement layer includes means for determining whether there is a mismatch between reference information of an enhancement layer relative to reference information of a base layer, and means for resolving the mismatch if there is a mismatch. The means for resolving the mismatch is configured to use reference information of a spatial motion vector candidate in the enhancement layer to determine or substitute reference information of the base layer.

The details of one or more examples are set forth in the accompanying drawings and the description below. Other features, objects, and advantages will be apparent from the description and drawings, and from the claims. The systems, methods and devices described herein can include any combinations of the disclosed aspects, and can be performed by an encoder or a decoder, or a coding system.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
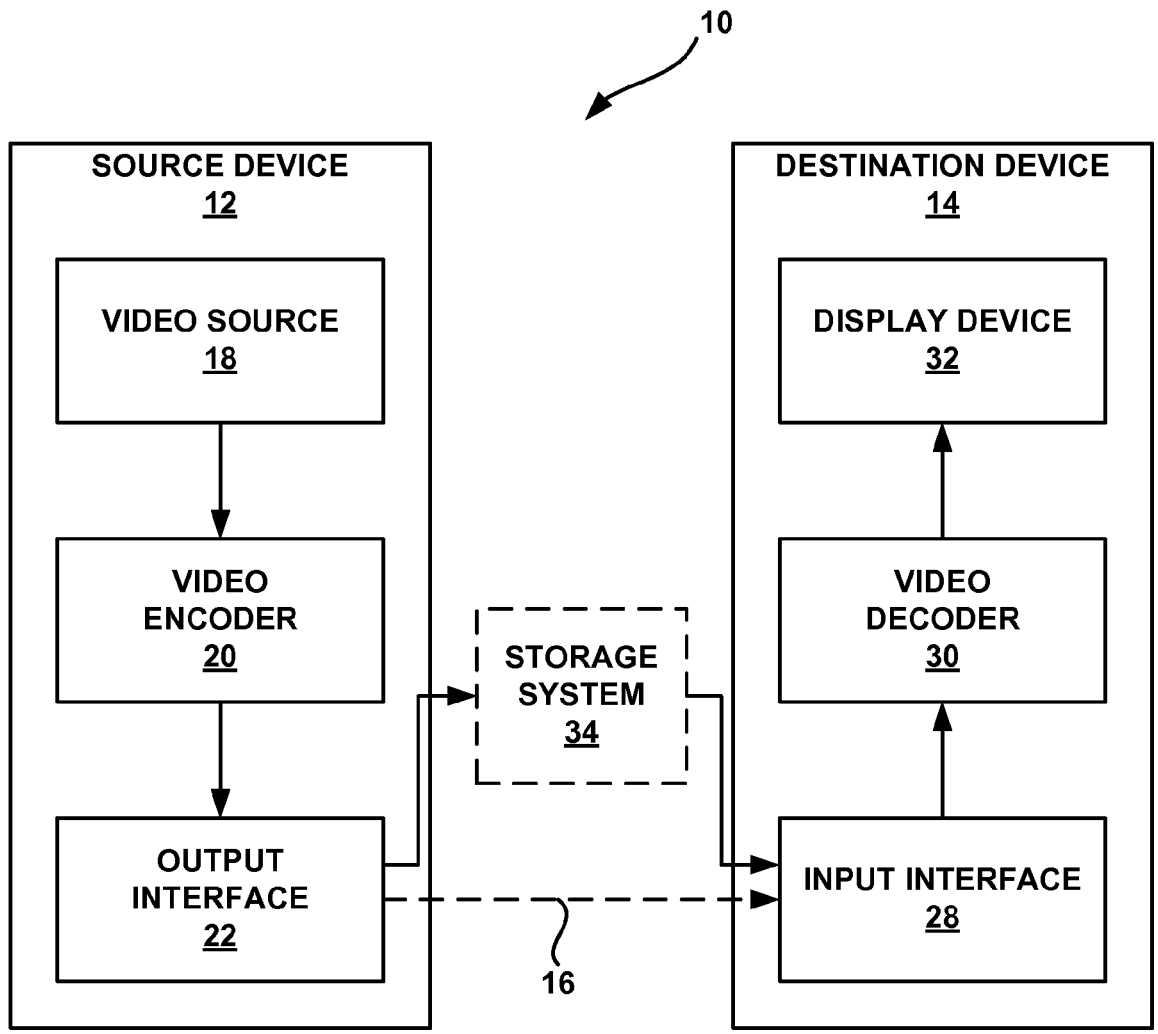
FIG. 1 is a block diagram illustrating an example video encoding and decoding system that may utilize techniques in accordance with aspects described in this disclosure.

The techniques described in this disclosure generally relate to scalable video coding (SVC) and multiview/3D video coding. For example, the techniques may be related to, and used with or within, a High Efficiency Video Coding (HEVC) scalable video coding (SVC) extension. In an SVC extension, there could be multiple layers of video information. A layer at the very bottom level or lowest level may serve as a base layer (BL) or reference layer (RL), and the layer at the very top may serve as an enhanced layer (EL). The "enhanced layer" is sometimes referred to as an "enhancement layer," and these terms may be used interchangeably. Layers between the BL and EL may serve as either or both ELs or reference layers (RLs). For example, a layer may be an EL for the layers below it, such as the base layer or any intervening enhancement layers, and also serve as a RL for the enhancement layers above it. For SVC, a base layer typically carries video data with a base level of quality. One or more enhancement layers carry additional video data to support higher spatial, temporal and/or signal-to-noise (SNR) levels. Enhancement layers may be defined relative to the previously encoded layer.

For purposes of illustration only, the techniques described in the disclosure are described using examples including only two layers. One layer can include a lower level layer or reference layer, and another layer can include a higher level layer or enhancement layer. For example, the reference layer can include a base layer or a temporal reference on an enhancement layer, and the enhancement layer can include an enhanced layer relative to the reference layer. It should be understood that the examples described in this disclosure can be extended to examples with multiple base layers and enhancement layers as well. In addition, for ease of explanation, the following disclosure mainly uses the terms "frames" or "blocks." However, these terms are not meant to be limiting. For example, the techniques described below can be used with different video units, such as blocks (e.g., CU, PU, TU, macroblocks, etc.), slices, frames, pictures, etc.

Merge mode refers to one or more video coding modes in which motion information (such as motion vectors, reference frame indexes, prediction directions, or other information) of a neighboring video block are inherited for a current video block being coded. An index value may be used to identify the neighbor from which the current video block inherits its motion information (e.g., a top, top right, left, left bottom block, relative to the current block, or a co-located block from a temporally adjacent frame). Skip mode may comprise one type of merge mode (or a mode similar to merge mode). With skip mode, motion information is inherited, but no residual information is coded. Residual information may generally refer to pixel difference information indicating pixel differences between the block to be coded and the block from which the motion information is inherited. Direct mode may be another type of merge mode (or mode similar to merge mode). Direct mode may be similar to skip mode in that motion information is inherited, but with direct mode, a video block is coded to include residual information. The phrase "merge mode" is used herein to refer to any one of these modes, which may be called skip mode, direct mode or merge mode.

Another case where the motion vector of a neighboring video block is used in the coding of a current video block is so-called motion vector prediction or advanced motion vector prediction (AMVP). In these cases, predictive coding of motion vectors is applied to reduce the amount of data needed to communicate the motion vector. For example, rather than encoding and communicating the motion vector itself, a video encoder may encode and communicate a motion vector difference (MVD) relative to a known (or knowable) motion vector. In H.264/AVC, the known motion vector, which may be used with the MVD to define the current motion vector, can be defined by a so-called motion vector predictor (MVP), which is derived as the median of motion vectors associated with neighboring blocks.

Advanced motion vector prediction (AMVP) is a technique that may be used to encode the motion information of a current video block. AMVP builds a motion vector candidate set by including several candidate blocks in spatial and temporal directions as candidates for the MVP. In AMVP, the video encoder selects the most accurate predictor block from the candidate set based on analysis of encoding rate and distortion (e.g., using so-called rate-distortion cost analysis). A motion vector predictor index (mvp_idx) can be transmitted as part of an encoded bitstream and can be decoded and used by a video decoder to inform the video decoder where to locate the MVP. A MVD can also be transmitted in the bitstream. The video decoder can combine the MVD with the MVP (defined by the motion vector predictor index) so as to generate the motion vector for the current video block. Some aspects of this disclosure concern AMVP in which candidate data is obtained or derived from a base layer for AMVP coding of an enhancement layer block.

Video Coding Standards

In general, video coding standards can include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its SVC and Multiview Video Coding (MVC) extensions. Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). The latest HEVC draft specification, referred to as HEVC WD10 hereinafter, is available from http://phenix.int-evry.fr/jct/doc_end_user/documents/12_Geneva/wg11/JCTVC-L1003-v34.zip. The full citation for the HEVC WD10 is document JCTVC-L1003_v34, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, is also being developed by the JCT-3V. The latest MV-HEVC draft specification, referred to as MV-HEVC WD3 hereinafter, is downloadable from http://phenix.it-sudparis.eu/jct2/doc_end_user/documents/3_Geneva/wg11/JCT3V-C1004-v4.zip. The scalable extension to HEVC, named SHVC, is also being developed by the JCT-VC. A recent Working Draft (WD) of SHVC, referred to as SHVC WD1 hereinafter, is available from http://phenix. int-evry. fr/jct/doc_end user/documents/12_Geneva/wg11/JCTVC-L1008-v1.zip.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

SVC may be used to provide quality (also referred to as signal-to-noise (SNR)) scalability, spatial scalability (e.g., resolution scaling), and/or temporal scalability (e.g., frame rate scaling). For example, in one embodiment, a reference layer (e.g., a base layer) includes video information sufficient to display a video at a first quality level and the enhancement layer includes additional video information relative to the reference layer such that the reference layer and the enhancement layer together include video information sufficient to display the video at a second quality level higher than the first level (e.g., less noise, greater resolution, better frame rate, etc.). An enhanced layer may have a different spatial resolution than a base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In the SVC, prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion of the base layer to predict motion in the enhancement layer. As used herein, a co-located block in the base layer refers to a block located at a position in the base layer that corresponds with a position of the current block in the enhancement layer. Inter-layer residual prediction uses the residue of the base layer to predict the residue of the enhancement layer.

In SVC, an access unit may comprise a number of frames at different layers with the same POC (picture order count) value. However, a reference frame index (also called a reference index) inherited from BL may not always be valid for EL. In some instances, one or more BL reference lists may have a different number of frames than one or more EL reference lists. For example, assume that BL reference lists have 4 frames and EL reference lists have 2 frames. In this case, if a BL reference index equals 3, this reference index would be invalid for the EL since there is no corresponding reference frame in the EL reference lists with a reference index value of 3.

In some instances, even when the BL reference lists have the same number of reference frames as the EL reference lists, frame POC values for the reference frames with the same index value can be different between the BL and the EL. In other words, reference frames at different layers with the same reference index value may come from different access units. For example, the reference frame with a reference index value of 1 at BL may have a POC value of 10, while the reference frame with a reference index value of 1 at EL may have a POC value of 15. In this case, it may not be efficient to directly inherit the reference index value from BL and use it for coding a current EL layer block.

The methods and techniques of this disclosure provide several methods and solutions in deriving a valid reference index value from a BL that can improve coding efficiency of a current block at an EL. In some embodiments, the techniques of this disclosure may include checking reference information (e.g., a reference index and/or a reference frame POC) at both the encoder and decoder to ensure that the base layer motion information used for enhancement layer coding is valid, for example merge and/or AMVP candidates are valid, particularly with respect to BL candidates used to code EL blocks.

In some embodiments, the techniques of this disclosure may include checking whether the BL reference index is valid for the EL. If the reference index is invalid, the mismatch may be resolved using one or more of the several methods and techniques described in this disclosure.

In some embodiments, a reference index may be checked and the corresponding reference frame POCs compared for both the BL and the EL. If the reference frame POCs are different for the BL and the EL, the mismatch may be resolved using one or more of the several methods and techniques described in this disclosure.

In some embodiments, only reference frame POC values may be checked and compared for both the BL and the EL. Using this technique, it may be determined whether one or more EL reference lists includes a reference frame with the BL reference frame POC. If the reference frame with the BL reference frame POC is found in one of the EL reference lists, the corresponding EL reference index can be used. For example, an EL reference list, for example list L0, is first checked, and if the needed reference frame with BL reference frame POC is not found, the next reference list, for example list L1, is then checked, and so on. If the reference frame is not found in any EL reference lists, the mismatch can be resolved accordingly using the techniques described in this disclosure.

Techniques for resolving a mismatch between BL and EL reference index and reference POC will now be described. According to one example of this disclosure, if the inherited reference index from BL is not valid for the EL, or if the EL reference frame list does not include a frame having the same reference frame POC as the BL reference frame POC, techniques may be applied to resolve the mismatch.

In one example, if a BL reference index is determined to be invalid for EL, the BL motion information may not be used for EL prediction or coding, for example BL motion vector (MV) candidate may be dropped and not inserted into the candidate lists for EL. Alternatively, if either the BL reference index is invalid for EL or the reference frame with the BL reference frame POC is not found in the EL reference lists, the BL motion information may not be used for EL prediction or coding, for example the BL MV candidate may be dropped and not inserted into the candidate lists.

As another example, an invalid BL reference index can be converted to one of the valid EL reference indices. For example, the BL reference index can be set to 0 or the maximum reference index value in a current EL reference list. Alternatively, the assigned reference index can be signaled in at least block level or slice, picture, sequence or video parameter sets or elsewhere. Also, additional MV scaling according to the temporal distance can be applied when converting the reference index to one of the valid EL reference indices.

As yet another example, the reference index for the BL motion information used to predict or code EL can be taken from one of the spatial motion information in the EL, for example BL MV candidate can be taken from one of the spatial MV candidates in the EL, with the following MV scaling if necessary applied to the BL MV. In some implementations, the scaling can be based on the temporal distance between the current frame and the reference frame. In some instances, some of the spatial MV candidates could be unavailable, so additionally, spatial MV candidates can be checked one by one in the predefined order, taking the first or other order available reference index. For example, this spatial location may correspond to the left MV candidate, in which case the left reference index would be used for BL MV, similar that it was in HEVC TMVP derivation. The BL MV can also be scaled according to the temporal distance between left reference index and BL reference index.

Alternatively or additionally, in some implementations MV scaling according to the temporal distance can be applied in AMVP mode if the BL reference frame POC is different from the POC value of the enhancement layer frame with a given reference index. In some examples of this case, the given reference index is the reference index signaled to the decoder side in a bitstream for AMVP mode.

In some examples, for a bi-directional MV candidate from BL, the techniques mentioned above can be applied to each prediction direction. In certain cases, the bi-directional BL motion information can be converted to uni-directional motion information, for example bi-directional MV candidate from BL can be converted to uni-directional MV candidate and used for EL prediction or coding. For example, if the base layer motion information, for example but not limited to BL MV candidate, is bi-directional and only one out of two reference indices is invalid for EL, the invalid reference index and corresponding MV can be dropped and the bi-directional BL motion information can be converted to a uni-directional motion information with valid reference index. In another example, if the base layer motion information, for example BL MV candidate, is bi-directional and for a certain direction, and the corresponding reference POC from BL does not present in the EL reference list for the same or other directions, the corresponding BL motion information for that direction can be dropped and the bi-directional BL motion information can be converted to uni-directional motion information.

Possible constraints on EL reference lists will now be described. In other examples consistent with this disclosure, to avoid the above mentioned problems with EL reference index, techniques may be configured to prohibit different numbers of reference frames in the lists for BL and EL layers. In this case, the number of reference frames in BL and EL can be ensured to be equal and there would be no invalid reference indices.

In some implementations, EL reference lists may be composed only of the reference frame POCs present in the BL reference lists.

In some implementations, the EL reference lists may be configured to contain all BL reference frames in one or both EL reference lists or vise-versa.

In some implementations, a constraint can be imposed on a bitstream. For example, the constraint may ensure that the bitstream shall not contain the BL reference index greater than number of reference frames in the EL reference list. Additionally, the constraint can be appended to ensure that a BL reference frame POC corresponding to the BL reference index shall be equal to the EL reference frame POC with the BL reference index for the particular EL reference list.

In various implementations, two or more of the techniques or methods described herein can be combined together to resolve a mismatch between BL and EL reference index and reference POC. For example, a reference frame POC corresponding to a BL reference index can be searched in the corresponding reference list of the EL, and if the reference frame POC is found, the reference index may be assigned to the BL motion information, for example BL MV candidate. Otherwise if the reference frame POC is not found, the reference index may be set to predefined value (e.g., zero), or alternatively the direction (e.g., L0 or L1) can be marked as unavailable, making BL motion information, for example BL MV candidate, uni-directional if it was bi-directional originally, or making BL motion information, for example used as BL MV candidate, completely unavailable if it was urn-directional initially.

The techniques and methods described in this disclosure can be applied for merge mode or AMVP mode, or for both. The techniques and methods described in this disclosure can also be applied for uni-directional MV candidates or bi-directional MV candidates, or for both. Also, techniques and methods described herein for solving the reference index problem can be chosen according to the inter prediction mode. For example, in some implementations, different methods can be applied for uni- and bi-directional MV candidates. In some implementation, the methods and techniques disclosed herein can also be used for different views, for example, for MVC and/or multiview/3DV extensions, in which a BL is substituted with another view, from which a motion information, for example MV candidate, can be derived.

In another embodiment, instead of or in addition to searching for the same POC in the EL reference lists relative to the BL reference picture POC, a search can be performed to find an EL reference picture of the same moment in time relative to the BL reference picture. This may be useful, for example, when the POC numbering is different in the BL and EL. This approach may also be implemented or applied to any case in which the POC is to be compared.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof FIG. 1 is a block diagram illustrating an example video encoding and decoding system that may utilize techniques in accordance with aspects described in this disclosure. In this disclosure, the term "video coding" may refer to video encoding and video decoding. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage system 34. Similarly, encoded data may be accessed from the storage system 34 by input interface 28. The storage system 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage system 34 may correspond to a file server or another intermediate storage system that may store the encoded video generated by source device 12. Destination device 14 may access stored video data from the storage system 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage system may be a streaming transmission, a download transmission, or a combination thereof The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony In the example of FIG. 1, source device 12 includes video source 18, video encoder 20, and output interface 22. In some cases, output interface 22 may include a modulator/demodulator (modem) and/or a transmitter. Destination device 14 includes input interface 28, video decoder 30, and display device 32. In accordance with this disclosure, video encoder 20 of source device 12 may be configured to apply the techniques for coding a bitstream including video data conforming to multiple standards or standard extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for resolving the mismatch between BL and EL reference indices and reference frame POCs may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

The techniques of this disclosure may also apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16. The encoded video information may also be stored onto a storage medium or a file server for later access by destination device 14 for decoding and/or playback Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission, direct wired communication, etc. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 may be integrated with or may be external to destination device 14. In some examples, destination device 14 may include an integrated display device and may also be configured to interface with an external display device. In other examples, destination device 14 may be a display device. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the HEVC standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard, including but not limited to any of the standards listed above. Other examples of video coding standards include MPEG-2 and ITU-T H.263 and proprietary or open source compression formats such as VP8 and related formats. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HIM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks may not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

In accordance with various embodiments, the video encoder 20 may be configured to perform one or more methods of coding video data in a scalable video coding scheme that defines at least one base layer and at least one enhancement layer. In one embodiment, the method may comprise determining whether there is a mismatch between reference information of an enhancement layer relative to reference information of a base layer. If there is not a mismatch, the method uses at least some of the reference information of the base layer to code the enhancement layer in accordance with a merge mode coding technique or an AMVP coding technique. If there is a mismatch between reference information of an enhancement layer relative to reference information of a base layer, the method resolves the mismatch. In another example, the method may comprise constraining the base layer and the enhancement layer such that mismatch cannot occur between the base layer and the enhancement layer when the enhancement layer is coded in accordance with a merge mode coding technique that uses base layer information or an AMVP coding technique that uses base layer information.

Figure 2:
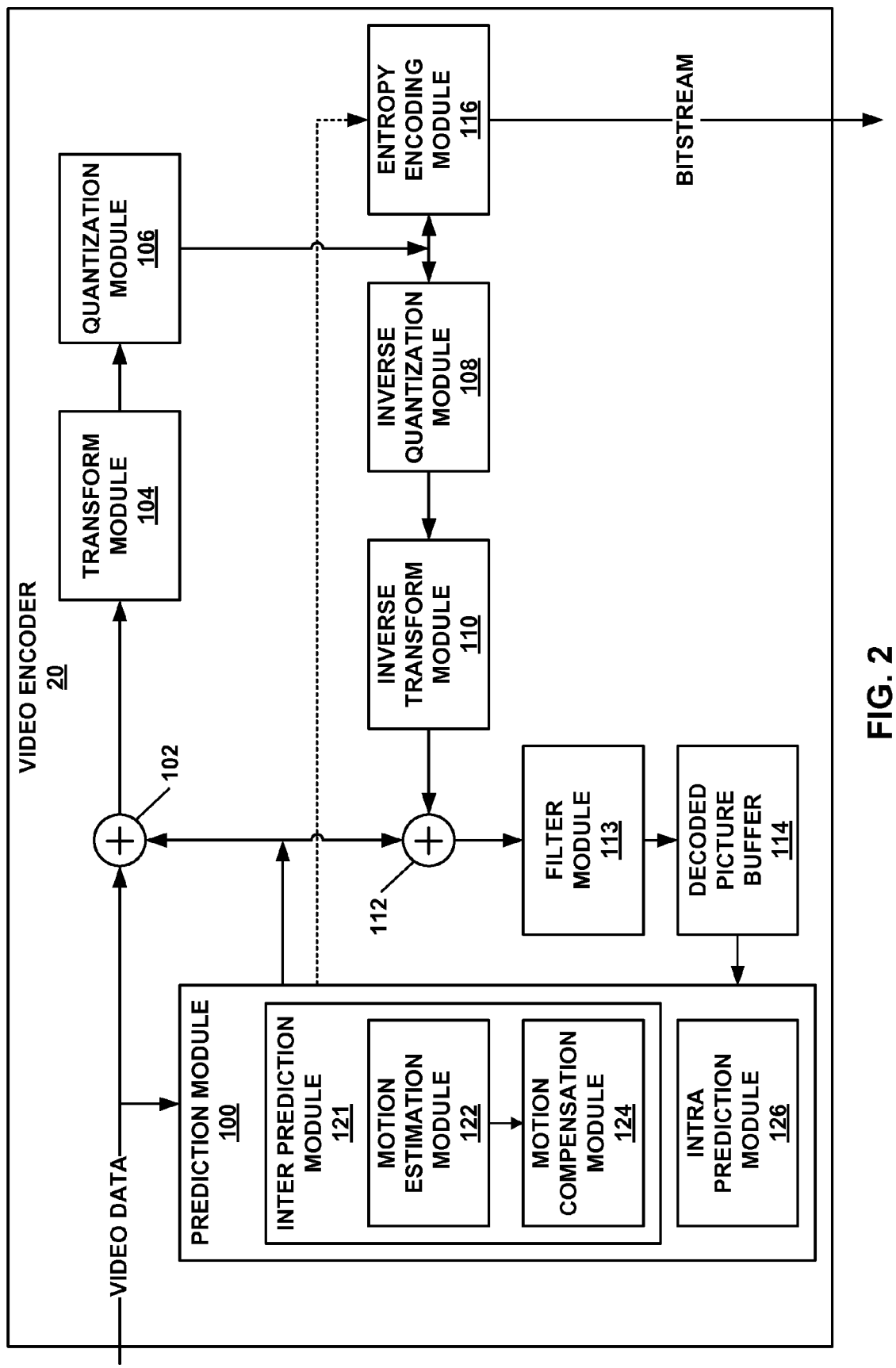
FIG. 2 is a block diagram illustrating an example of a video encoder that may implement techniques in accordance with aspects described in this disclosure.

FIG. 2 is a block diagram that illustrates an example video encoder 20 that can be configured to implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a plurality of functional components. The functional components of video encoder 20 include a prediction module 100, a residual generation module 102, a transform module 104, a quantization module 106, an inverse quantization module 108, an inverse transform module 110, a reconstruction module 112, a filter module 113, a decoded picture buffer 114, and an entropy encoding module 116. Prediction module 100 includes an inter prediction module 121, motion estimation module 122, a motion compensation module 124, and an intra prediction module 126. In other examples, video encoder 20 may include more, fewer, or different functional components. Furthermore, motion estimation module 122 and motion compensation module 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction module 100 may perform quadtree partitioning on the video block of the treeblock to divide the video block into progressively smaller video blocks. Each of the smaller video blocks may be associated with a different CU. For example, prediction module 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an NxN block generally has N samples in a vertical direction and N samples in a horizontal direction, where N represents a nonnegative integer value.

Furthermore, as part of performing the encoding operation on a treeblock, prediction module 100 may generate a hierarchical quadtree data structure for the treeblock. For example, a treeblock may correspond to a root node of the quadtree data structure. If prediction module 100 partitions the video block of the treeblock into four sub-blocks, the root node has four child nodes in the quadtree data structure. Each of the child nodes corresponds to a CU associated with one of the sub-blocks. If prediction module 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction module 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction module 100 may perform geometric partitioning to partition the video block of a CU among PUs of the CU along a boundary that does not meet the sides of the video block of the CU at right angles.

Inter prediction module 121 may perform inter prediction on each PU of the CU. Inter prediction may provide temporal compression. To perform inter prediction on a PU, motion estimation module 122 may generate motion information for the PU. Motion compensation module 124 may generate a predicted video block for the PU based the motion information and decoded samples of pictures other than the picture associated with the CU (i.e., reference pictures). In this disclosure, a predicted video block generated by motion compensation module 124 may be referred to as an inter-predicted video block.

Slices may be I slices, P slices, or B slices. Motion estimation module 122 and motion compensation module 124 may perform different operations for a PU of a CU depending on whether the PU is in an I slice, a P slice, or a B slice. In an I slice, all PUs are intra predicted. Hence, if the PU is in an I slice, motion estimation module 122 and motion compensation module 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation module 122 performs the motion estimation operation with regard to a PU in a P slice, motion estimation module 122 may search the reference pictures in list 0 for a reference block for the PU. The reference block of the PU may be a set of samples, e.g., a block of samples, that most closely corresponds to the samples in the video block of the PU. Motion estimation module 122 may use a variety of metrics to determine how closely a set of samples in a reference picture corresponds to the samples in the video block of a PU. For example, motion estimation module 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation module 122 may generate a reference index that indicates the reference picture in list 0 containing the reference block and a motion vector that indicates a spatial displacement between the PU and the reference block. In various examples, motion estimation module 122 may generate motion vectors to varying degrees of precision. For example, motion estimation module 122 may generate motion vectors at one-quarter sample precision, one-eighth sample precision, or other fractional sample precision. In the case of fractional sample precision, reference block values may be interpolated from integer-position sample values in the reference picture. Motion estimation module 122 may output the reference index and the motion vector as the motion information of the PU. Motion compensation module 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation module 122 may perform uni-directional prediction or bi-directional prediction for the PU. When motion estimation module 122 performs uni-directional prediction for the PU, motion estimation module 122 may search the reference pictures of list 0 or list 1 for a reference block for the PU. Motion estimation module 122 may then generate a reference index that indicates the reference picture in list 0 or list 1 that contains the reference block and a motion vector that indicates a spatial displacement between the PU and the reference block. Motion estimation module 122 may output the reference index, a prediction direction indicator, and the motion vector as the motion information of the PU. The prediction direction indicator may indicate whether the reference index indicates a reference picture in list 0 or list 1. Motion compensation module 124 may generate the predicted video block of the PU based on the reference block indicated by the motion information of the PU.

When motion estimation module 122 performs bi-directional prediction for a PU, motion estimation module 122 may search the reference pictures in list 0 for a reference block for the PU and may also search the reference pictures in list 1 for another reference block for the PU. Motion estimation module 122 may then generate reference indexes that indicate the reference pictures in list 0 and list 1 containing the reference blocks and motion vectors that indicate spatial displacements between the reference blocks and the PU. Motion estimation module 122 may output the reference indexes and the motion vectors of the PU as the motion information of the PU. Motion compensation module 124 may generate the predicted video block of the PU based on the reference blocks indicated by the motion information of the PU.

In some instances, motion estimation module 122 does not output a full set of motion information for a PU to entropy encoding module 116. Rather, motion estimation module 122 may signal the motion information of a PU with reference to the motion information of another PU. For example, motion estimation module 122 may determine that the motion information of the PU is sufficiently similar to the motion information of a neighboring PU. In this example, motion estimation module 122 may indicate, in a syntax structure associated with the PU, a value that indicates to video decoder 30 that the PU has the same motion information as the neighboring PU.

In another example, motion estimation module 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As part of performing an encoding operation on a CU, intra prediction module 126 may perform intra prediction on PUs of the CU. Intra prediction may provide spatial compression. When intra prediction module 126 performs intra prediction on a PU, intra prediction module 126 may generate prediction data for the PU based on decoded samples of other PUs in the same picture. The prediction data for the PU may include a predicted video block and various syntax elements. Intra prediction module 126 may perform intra prediction on PUs in I slices, P slices, and B slices.

To perform intra prediction on a PU, intra prediction module 126 may use multiple intra prediction modes to generate multiple sets of prediction data for the PU. When intra prediction module 126 uses an intra prediction mode to generate a set of prediction data for the PU, intra prediction module 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction module 126 may use various numbers of intra prediction modes, e.g., 33 directional intra prediction modes, depending on the size of the PU.

Prediction module 100 may select the prediction data for a PU from among the prediction data generated by motion compensation module 124 for the PU or the prediction data generated by intra prediction module 126 for the PU. In some examples, prediction module 100 selects the prediction data for the PU based on rate/distortion metrics of the sets of prediction data.

If prediction module 100 selects prediction data generated by intra prediction module 126, prediction module 100 may signal the intra prediction mode that was used to generate the prediction data for the PUs, i.e., the selected intra prediction mode. Prediction module 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction module 100 may generate a syntax element to indicate that the selected intra prediction mode is the same as the intra prediction mode of the neighboring PU.

After prediction module 100 selects the prediction data for PUs of a CU, residual generation module 102 may generate residual data for the CU by subtracting the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction module 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform module 104 may generate one or more transform coefficient blocks for each TU of a CU by applying one or more transforms to a residual video block associated with the TU. Each of the transform coefficient blocks may be a 2D matrix of transform coefficients. Transform module 104 may apply various transforms to the residual video block associated with a TU. For example, transform module 104 may apply a discrete cosine transform (DCT), a directional transform, or a conceptually similar transform to the residual video block associated with a TU.

After transform module 104 generates a transform coefficient block associated with a TU, quantization module 106 may quantize the transform coefficients in the transform coefficient block. Quantization module 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization module 108 and inverse transform module 110 may apply inverse quantization and inverse transforms to the transform coefficient block, respectively, to reconstruct a residual video block from the transform coefficient block. Reconstruction module 112 may add the reconstructed residual video block to corresponding samples from one or more predicted video blocks generated by prediction module 100 to produce a reconstructed video block associated with a TU. By reconstructing video blocks for each TU of a CU in this way, video encoder 20 may reconstruct the video block of the CU.

After reconstruction module 112 reconstructs the video block of a CU, filter module 113 may perform a deblocking operation to reduce blocking artifacts in the video block associated with the CU. After performing the one or more deblocking operations, filter module 113 may store the reconstructed video block of the CU in decoded picture buffer 114. Motion estimation module 122 and motion compensation module 124 may use a reference picture that contains the reconstructed video block to perform inter prediction on PUs of subsequent pictures. In addition, intra prediction module 126 may use reconstructed video blocks in decoded picture buffer 114 to perform intra prediction on other PUs in the same picture as the CU.

Entropy encoding module 116 may receive data from other functional components of video encoder 20. For example, entropy encoding module 116 may receive transform coefficient blocks from quantization module 106 and may receive syntax elements from prediction module 100. When entropy encoding module 116 receives the data, entropy encoding module 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding module 116 may output a bitstream that includes the entropy encoded data.

As part of performing an entropy encoding operation on data, entropy encoding module 116 may select a context model. If entropy encoding module 116 is performing a CABAC operation, the context model may indicate estimates of probabilities of particular bins having particular values. In the context of CABAC, the term "bin" is used to refer to a bit of a binarized version of a syntax element.

Figure 3:
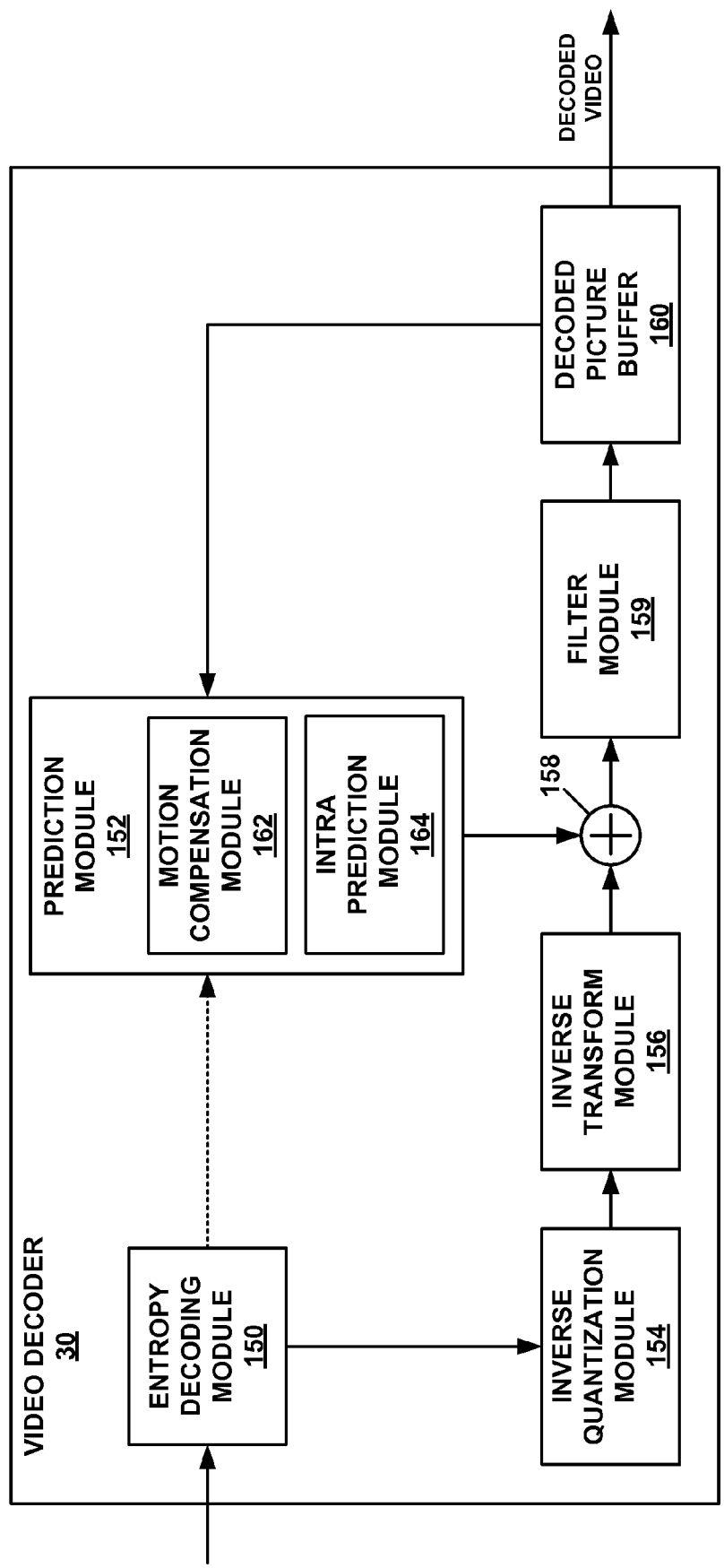
FIG. 3 is a block diagram illustrating an example of a video decoder that may implement techniques in accordance with aspects described in this disclosure.

FIG. 3 is a block diagram that illustrates an example video decoder 30 that can be configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In one embodiment, video decoder 30 may be configured to perform one or more methods of coding video data in a scalable video coding scheme that defines at least one base layer and at least one enhancement layer. The operations performed by video encoder 20 and video decoder 30 may be similar or identical with respect to the construction of candidate lists for AMVP or with respect to identification of a merge candidate. The method may comprise determining whether these is a mismatch between reference information of an enhancement layer relative to reference information of a base layer; if there is not a mismatch, using at least some of the reference information of the base layer to code the enhancement layer in accordance with a merge mode coding technique or an AMVP coding technique; and if there is a mismatch between reference information of an enhancement layer relative to reference information of a base layer, resolving the mismatch. In another example, the method may comprise constraining the base layer and the enhancement layer such that mismatch cannot occur between the base layer and the enhancement layer when the enhancement layer is coded in accordance with a merge mode coding technique that uses base layer information or an AMVP coding technique that uses base layer information.

In the example of FIG. 3, video decoder 30 includes a plurality of functional components. The functional components of video decoder 30 include an entropy decoding module 150, a prediction module 152, an inverse quantization module 154, an inverse transform module 156, a reconstruction module 158, a filter module 159, and a decoded picture buffer 160. Prediction module 152 includes a motion compensation module 162 and an intra prediction module 164. In some examples, video decoder 30 may perform a decoding pass generally reciprocal to the encoding pass described with respect to video encoder 20 of FIG. 1. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding module 150 may perform a parsing operation on the bitstream. As a result of performing the parsing operation on the bitstream, entropy decoding module 150 may extract syntax elements from the bitstream. As part of performing the parsing operation, entropy decoding module 150 may entropy decode entropy encoded syntax elements in the bitstream. Prediction module 152, inverse quantization module 154, inverse transform module 156, reconstruction module 158, and filter module 159 may perform a reconstruction operation that generates decoded video data based on the syntax elements extracted from the bitstream.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding module 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding module 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding module 150 may perform entropy decoding operations, such as CABAC decoding operations, on syntax elements in the coded slice header to recover the slice header.

As part of extracting the slice data from coded slice NAL units, entropy decoding module 150 may perform parsing operations that extract syntax elements from coded CUs in the slice data. The extracted syntax elements may include syntax elements associated with transform coefficient blocks. Entropy decoding module 150 may then perform CABAC decoding operations on some of the syntax elements.

After entropy decoding module 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization module 154 may inverse quantize, i.e., de-quantize, a transform coefficient block associated with the TU. Inverse quantization module 154 may inverse quantize the transform coefficient block in a manner similar to the inverse quantization processes proposed for HEVC or defined by the H.264 decoding standard. Inverse quantization module 154 may use a quantization parameter QP calculated by video encoder 20 for a CU of the transform coefficient block to determine a degree of quantization and, likewise, a degree of inverse quantization for inverse quantization module 154 to apply.

After inverse quantization module 154 inverse quantizes a transform coefficient block, inverse transform module 156 may generate a residual video block for the TU associated with the transform coefficient block. Inverse transform module 156 may apply an inverse transform to the transform coefficient block in order to generate the residual video block for the TU. For example, inverse transform module 156 may apply an inverse DCT, an inverse integer transform, an inverse Karhunen-Loeve transform (KLT), an inverse rotational transform, an inverse directional transform, or another inverse transform to the transform coefficient block.

In some examples, inverse transform module 156 may determine an inverse transform to apply to the transform coefficient block based on signaling from video encoder 20. In such examples, inverse transform module 156 may determine the inverse transform based on a signaled transform at the root node of a quadtree for a treeblock associated with the transform coefficient block. In other examples, inverse transform module 156 may infer the inverse transform from one or more coding characteristics, such as block size, coding mode, or the like. In some examples, inverse transform module 156 may apply a cascaded inverse transform.

In some examples, motion compensation module 162 may refine the predicted video block of a PU by performing interpolation based on interpolation filters. Identifiers for interpolation filters to be used for motion compensation with sub-sample precision may be included in the syntax elements. Motion compensation module 162 may use the same interpolation filters used by video encoder 20 during generation of the predicted video block of the PU to calculate interpolated values for sub-integer samples of a reference block. Motion compensation module 162 may determine the interpolation filters used by video encoder 20 according to received syntax information and use the interpolation filters to produce the predicted video block.

If a PU is encoded using intra prediction, intra prediction module 164 may perform intra prediction to generate a predicted video block for the PU. For example, intra prediction module 164 may determine an intra prediction mode for the PU based on syntax elements in the bitstream. The bitstream may include syntax elements that intra prediction module 164 may use to determine the intra prediction mode of the PU.

In some instances, the syntax elements may indicate that intra prediction module 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction module 164 may then use the intra prediction mode to generate prediction data (e.g., predicted samples) for the PU based on the video blocks of spatially neighboring PUs.

Reconstruction module 158 may use the residual video blocks associated with TUs of a CU and the predicted video blocks of the PUs of the CU, i.e., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction module 158 reconstructs the video block of the CU, filter module 159 may perform a deblocking operation to reduce blocking artifacts associated with the CU. After filter module 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Figure 4:
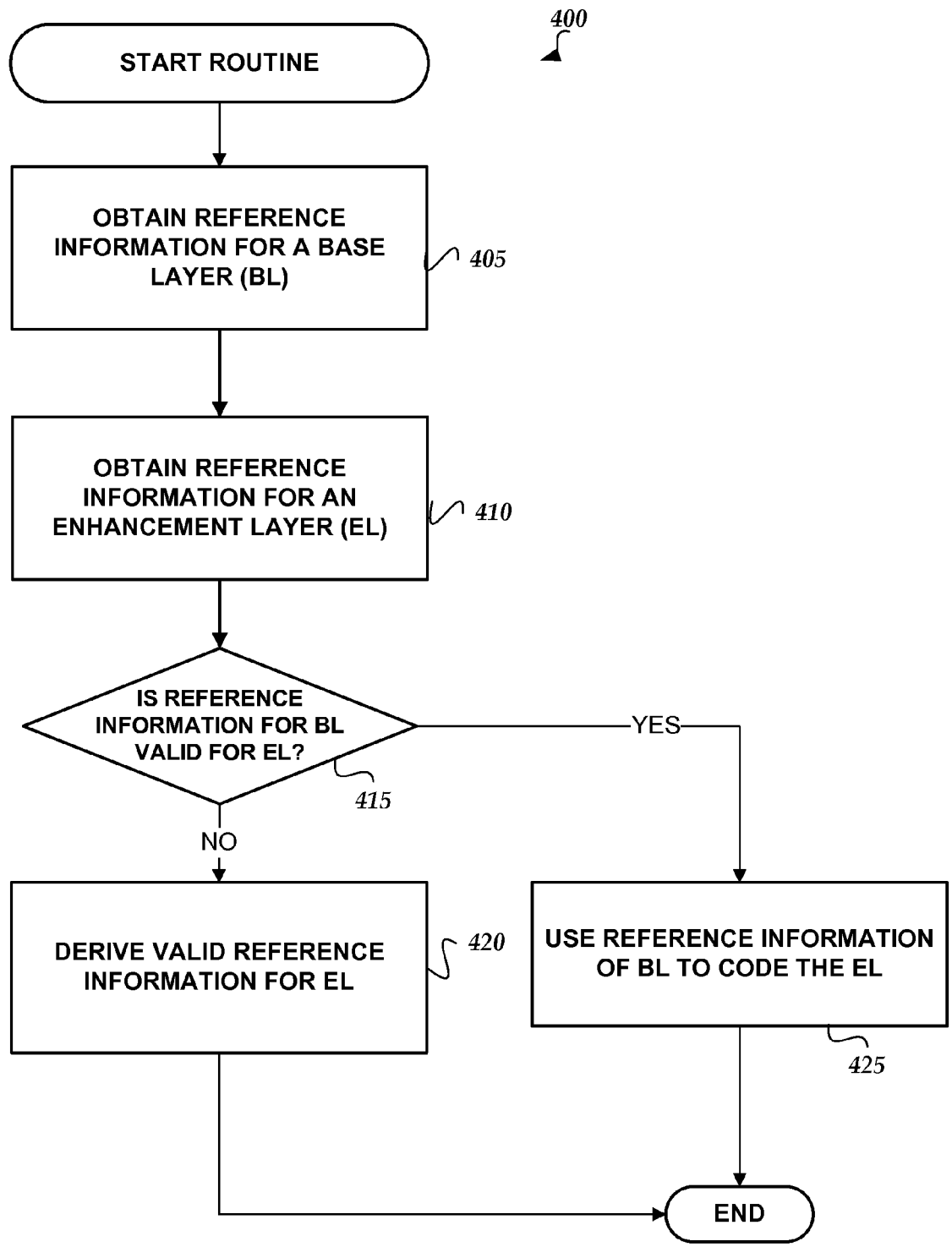
FIG. 4 is a flowchart illustrating one embodiment of a method for a coding routine in accordance with aspects described in this disclosure.

FIG. 4 is a flowchart illustrating an embodiment of a method for a coding routine according to aspects of this disclosure. The process 400 may be performed by an encoder (e.g., the encoder as shown in FIG. 2), a decoder (e.g., the decoder as shown in FIG. 3), or any other component. The steps of the process 400 are described with respect to the video encoder 20 in FIG. 2, but the process 400 may be performed by other components, such as a decoder, as mentioned above. The examples below are intended to illustrate, but not to limit, various aspects of the process 400. In one embodiment, the process can be dynamic, with some procedures omitted and others added. In one example, multiple instances of the processes may be occurring concurrently, for different encoders and/or decoders.

At block 405, the encoder 20 obtains reference information associated with, for example, a base layer (or a first layer), and at block 410 the encoder obtains reference information associated with, for example, an enhancement layer. In some embodiments the base layer may be referred to as a first layer and/or a reference layer, and the enhancement layer may be referred to as a second layer and/or a reference layer. Reference information associated with the base layer and/or the enhancement layer may include reference index values, reference frame information such as picture order counts, and spatial motion information such as information about motion vector candidates used by merge and/or AMVP modes for encoding and decoding.

At block 415, the encoder 20 determines whether a reference index of a co-located block in the base layer is invalid relative to reference information associated with the enhancement layer. The determination may be made in a number of ways according to the embodiments and variations described in this disclosure. Some variations of the determination process are also described in more detail with respect to the process 500 to FIG. 5.

At block 420, if the encoder 20 determines that the reference index of the co-located block in the base layer is invalid relative to reference information associated with the enhancement layer, the encoder may then proceed to derive valid reference information for the enhancement layer. Deriving valid reference information may be performed in a number of ways according to the embodiments and variations described in this disclosure. Some variations of the deriving process are also described in more detail with respect to the process 600 to FIG. 6.

At block 425, if the encoder 20 determines that the reference index of the co-located block in the base layer is valid relative to reference information associated with the enhancement layer, the encoder may then proceed to use the reference information of the base layer to encode the enhancement layer, for example according to a merge mode coding technique or an advanced motion vector prediction (AMVP) coding technique as described above. The routine 400 can then end.

Figure 5:
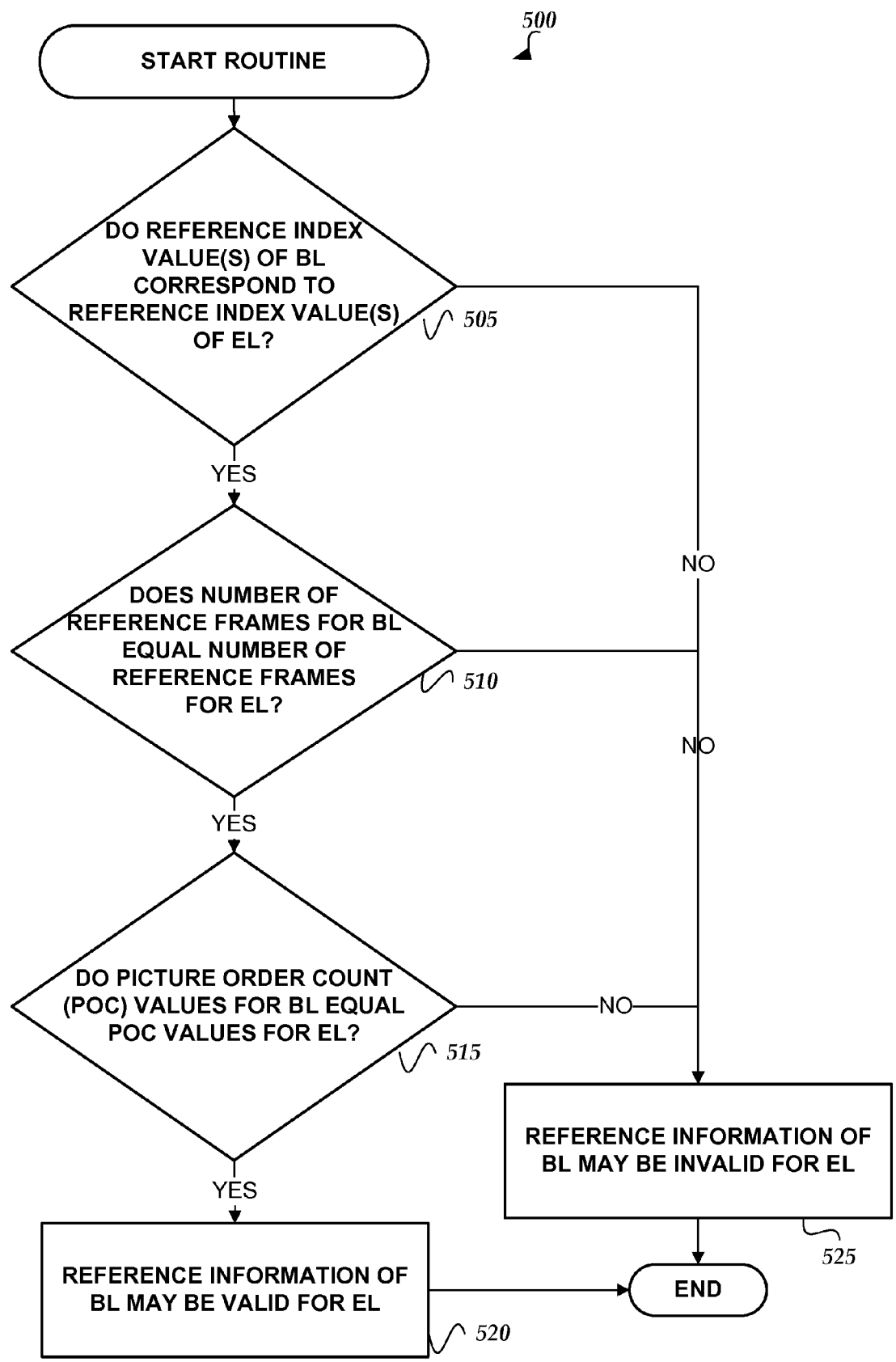
FIG. 5 is a flowchart illustrating one embodiment of a method for a coding routine in accordance with aspects described in this disclosure.

FIG. 5 is a flowchart illustrating an embodiment of a method for a routine for determining whether reference information from a base layer may be invalid for an enhancement layer according to aspects of this disclosure. The process 500 may be performed by an encoder (e.g., the encoder as shown in FIG. 2), a decoder (e.g., the decoder as shown in FIG. 3), or any other component. The steps of the process 500 are described with respect to the video encoder 20 in FIG. 2, but the process 500 may be performed by other components, such as a decoder, as mentioned above. The examples below are intended to illustrate, but not to limit, various aspects of the process 500. In one embodiment, the process can be dynamic, with some procedures omitted and others added. In one example, multiple instances of the processes may be occurring concurrently, for different encoders and/or decoders.

At block 505, the encoder 20 can check the reference index value of a co-located block in the the base layer relative to reference information of the enhancement layer. In some embodiments, the reference index of the base layer is invalid relative to the reference index of the enhancement layer when there is no reference information of the enhancement layer that corresponds to the reference index value for the reference index of the base layer. Block 510 presents another way to check the validity of the reference index by comparing the number of reference frames in a reference index or reference list. In this alternative, the reference information may be invalid if the number of reference frames in the reference index of the base layer is not equal to the number of reference frames in the reference index of the enhancement layer.

At block 515, the encoder 20 may optionally check the picture order counts associated with reference frames in the reference indices for the base layer and the enhancement layer.

At block 520, the encoder 20 may, after performing the steps at blocks 505, 510, and 515 determine that the reference index of the co-located block of the base layer may be valid for the enhancement layer. If the reference information is determined to be valid the encoder 20 may use the reference information to encode the enhancement layer, for example in accordance with block 535 of FIG. 4 and the methods described herein. In some embodiments, the process 500 may also comprise other steps to check the validity of the reference information not shown in FIG. 5.

At block 525, the encoder 20 may, after performing the steps at blocks 505, 510, and 515 determine that the reference index of the co-located block of the base layer may be invalid for the enhancement layer. For example, if the encoder 20 determines that the (1) the reference index value of a base layer is an invalid reference index value for an enhancement layer, (2) the number of reference frames in the reference index of the base layer does not match the number of reference frames in the reference index of the enhancement layer, or (3) picture order count values associated with the respective reference frames of the base and enhancement layers do not match, then the reference information may be invalid and further steps may be required in order to derive valid reference information, for example in accordance with block 420 of FIG. 4, with respect to the process 600 of FIG. 6, and/or the methods described herein. The routine 500 can then end.

Figure 6:
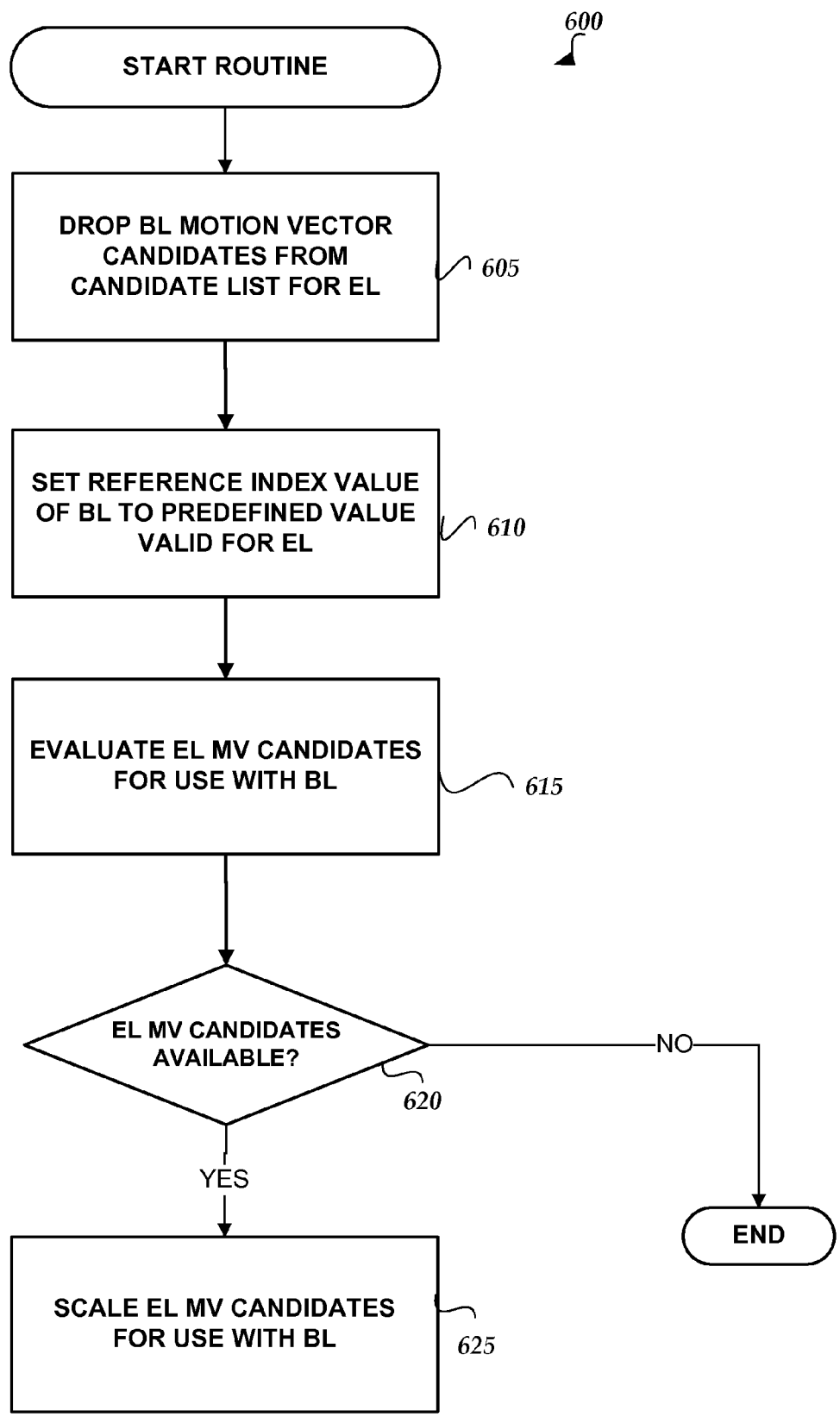
FIG. 6 is a flowchart illustrating one embodiment of a method for a coding routine in accordance with aspects described in this disclosure.

FIG. 6 is a flowchart illustrating an embodiment of a method for a routine for deriving valid reference information from a base layer may for an enhancement layer according to aspects of this disclosure. The process 600 may be performed by an encoder (e.g., the encoder as shown in FIG. 2), a decoder (e.g., the decoder as shown in FIG. 3), or any other component. The steps of the process 600 are described with respect to the video encoder 20 in FIG. 2, but the process 600 may be performed by other components, such as a decoder, as mentioned above. The examples below are intended to illustrate, but not to limit, various aspects of the process 600. In one embodiment, the process can be dynamic, with some procedures omitted and others added. In one example, multiple instances of the processes may be occurring concurrently, for different encoders and/or decoders.

At block 605, after determining that the base layer reference index of the base layer is invalid for the enhancement layer, the encoder 20 can, according to some embodiments, omit, or drop, one or more motion vector candidates associated with spatial motion information of the base layer from one or motion vector candidate lists, wherein the one or more motion vector candidate lists are used for coding the enhancement layer. Alternatively, if either the base layer reference index is invalid for enhancement layer or the reference frame with the base layer reference frame picture order count is not found in the enhancement layer reference lists, the base layer motion vector candidate may be dropped and not inserted into the candidate lists.

At block 610, the encoder 20 may, according to some embodiments, set the reference index value of the base layer to a predefined value that is valid for the enhancement layer. For example, a valid predefined value may be zero or it may be the maximum reference index value of the enhancement layer. Also, the encoder 20 may optionally apply additional motion vector scaling according to the temporal distance when converting the reference index to one of the valid enhancement layer reference indices. The encoder 20 can perform this step in response to a determination that the reference index of the base layer is invalid relative to the reference index of the enhancement layer.

At block 615, the encoder 20 may, according to some embodiments, evaluate one or more motion vector candidates associated with the spatial motion information of the enhancement layer. For example, as described above, the motion vector candidates of the enhancement layer may provide reference information that can be used to construct or derive valid reference information from the base layer.

At block 620, the encoder 20 determines whether the one or more motion vectors of the enhancement layer are available. In some embodiments, some of the spatial motion vector candidates could be unavailable, so additionally, spatial motion vector candidates can be checked one by one in a predefined order, with the first or other order available reference index selected. and At block 625, if one or more motion vector candidates from the enhancement layer are determined to be available, the encoder 20 may derive one or more motion vector candidates for the base layer (e.g., one or more motion vectors to be used for a second layer coding) using one or more of the evaluated motion vector candidates associated with the spatial motion information of the enhancement layer. Here the encoder 20 may if necessary also apply temporal scaling, for example in AMVP mode if the base layer reference frame picture order count is different from the picture order count value of the enhancement layer frame with a given reference index. This given reference index is the reference index signaled to the decoder side in a bitstream in AMVP mode.

Once the encoder 20 derives valid reference information from the base layer according to the process 600, the routine 600 can then end.

In some embodiments, other variations for deriving valid reference information not shown in FIG. 6 but otherwise described in this disclosure may be used by the encoder 20. In addition, various methods of determining whether reference information of a base layer is valid for an enhancement layer (see, e.g., FIG. 4) may be combined with the various methods of deriving and/or determining valid reference information (see, e.g., FIG. 6). All of these possible combinations are covered by the scope of this disclosure.

While the above disclosure has described particular embodiments, many variations are possible. For example, as mentioned above, the above techniques may be applied to 3D video encoding. In some embodiments of 3D video, a reference layer (e.g., a base layer) includes video information sufficient to display a first view of a video and the enhancement layer includes additional video information relative to the reference layer such that the reference layer and the enhancement layer together include video information sufficient to display a second view of the video. These two views can used to generate a stereoscopic image.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    receiving syntax elements extracted from an encoded video bit stream, wherein the syntax elements comprise at least reference information associated with a co-located block in a first layer of the video data and reference information associated with a corresponding block in a second layer of the video data, and wherein the co-located block is located at a position in the first layer corresponding to a position of the corresponding block in the second layer;
    determining whether the reference information associated with the co-located block in the first layer is invalid for the corresponding block in the second layer relative to the reference information associated with the second layer; and
    in response to determining that the reference information associated with the co-located block in the first layer is invalid for the corresponding block in the second layer, determining valid reference information for the corresponding block in the second layer.

2. The method of claim 1, further comprising:
    in response to determining that the reference information associated with the co-located block in the first layer is valid relative to the reference information associated with the second layer, using at least some of the reference information associated with the co-located block in the first layer to code the corresponding block in the second layer according to a merge mode coding technique or an advanced motion vector prediction (AMVP) coding technique.

3. The method of claim 1, wherein determining whether the reference information associated with the co-located block in the first layer is invalid for the corresponding block in the second layer relative to the reference information associated with the second layer comprises:

determining whether a reference index associated with the reference information of the first layer is an invalid reference index for the second layer.

4. The method of claim 3, wherein a reference index associated with the reference information of the first layer is determined to be an invalid reference index for the second layer when there is no reference frame in a reference frame list of the second layer corresponding to the reference index of the co-located block in the first layer.

5. The method of claim 3, wherein the reference information of the respective first and second layers includes one or more reference frames of the respective layers, and wherein the reference index of the first layer is an invalid reference index for the second layer when the number of reference frames in the reference index of the first layer is not equal to the number of reference frames in the reference index of the second layer.

6. The method of claim 3, wherein determining valid reference information for the corresponding block in the second layer comprises converting a bi-directional motion vector associated with the reference information of the first layer to a uni-directional motion vector, wherein the bi-directional motion vector includes at least one reference index that is invalid for the corresponding block in the second layer.

7. The method of claim 3, wherein determining valid reference information for the corresponding block in the second layer comprises marking one or more uni-directional motion vectors associated with the reference information of the first layer as unavailable.

8. The method of claim 1, wherein the reference information associated with the co-located block in the first layer includes one or more first layer reference lists, and one or more first layer reference frames associated with each of the one or more first layer reference lists, and wherein the reference information associated with second layer includes one or more second layer reference frames, and wherein determining whether the reference information associated with the co-located block in the first layer is invalid for the corresponding block in the second layer relative to the reference information associated with the second layer comprises:

determining that none of the one or more second layer reference frames has a picture order count (POC) value equal to at least one picture order count (POC) value associated with the one or more first layer reference frames in at least one of the one or more first layer reference lists.

9. The method of claim 3, wherein determining valid reference information for the corresponding block in the second layer comprises:

omitting one or more motion vectors associated with the reference information of the first layer from use for coding the second layer.

10. The method of claim 4, wherein determining valid reference information for the corresponding block in the second layer comprises:

converting a reference index associated with the reference information of the first layer into a valid reference index for the second layer by setting the first reference index value for the reference index associated with the reference information of the first layer to a valid predefined reference index value for the second layer.

11. The method of claim 4, wherein determining valid reference information for the corresponding block in the second layer comprises:

converting a reference index associated with the reference information of the first layer into a valid reference index for the second layer by setting the first reference index value for the reference index associated with the reference information of the first layer to zero or to a maximum reference index value for the reference index of the second layer.

12. The method of claim 8, wherein determining valid reference information for the corresponding block in the second layer comprises:

omitting one or more motion vectors associated with the reference information of the first layer from use for coding the second layer.

13. The method of claim 1, wherein determining valid reference information for the corresponding block in the second layer comprises:

evaluating one or more motion vectors associated with reference information of the second layer; and deriving one or more motion vectors to be used in the second layer coding from the first layer using one or more of the evaluated motion vectors associated with the reference information of the second layer.

14. The method of claim 13, wherein deriving one or more motion vector to be used in the second layer coding from the first layer further comprises scaling the one or more motion vectors from the first layer.

15. The method of claim 1, wherein the reference information of the first and second layers include reference information related to one or more reference frames of the respective layers, and wherein the number of reference frames in a reference index associated with the reference information of the first layer is equal to the number of reference frames for the second layer.

16. The method of claim 1, wherein the reference information of the first and second layers include reference information related to one or more reference frames of the respective layers, and wherein the one or more reference frames of the second layer comprise only the one or more reference frames of the first layer.

17. The method of claim 1, wherein the first layer is a base layer and the second layer is an enhancement layer.

18. A method of encoding video data, the method comprising:

receiving reference information associated with a co-located block in a first layer of the video data and reference information associated with a corresponding block in a second layer of the video data, and wherein the co-located block is located at a position in the first layer corresponding to a position of the corresponding block in the second layer;

determining whether the reference information associated with the co-located block in the first layer is invalid for the corresponding block in the second layer relative to the reference information associated with the second layer;

in response to determining that the reference information associated with the co-located block in the first layer is invalid for the corresponding block in the second layer, determining valid reference information for the corresponding block in the second layer; and generating a syntax element for an encoded video bit stream based on the determined valid reference information for the corresponding block in the second layer.

19. The method of claim 18, further comprising:

in response to determining that the reference information associated with the co-located block in the first layer is valid relative to the reference information associated with the second layer, using at least some of the reference information associated with the co-located block in the first layer to code the corresponding block in the second layer according to a merge mode coding technique or an advanced motion vector prediction (AMVP) coding technique.

20. The method of claim 18, wherein determining whether the reference information associated with the co-located block in the first layer is invalid for the corresponding block in the second layer relative to the reference information associated with the second layer comprises:
determining whether a reference index associated with the reference information of the first layer is an invalid reference index for the second layer.

21. The method of claim 20, wherein a reference index associated with the reference information of the first layer is determined to be an invalid reference index for the second layer when there is no reference frame in a reference frame list of the second layer corresponding to the reference index of the co-located block in the first layer.

22. The method of claim 20, wherein the reference information of the respective first and second layers includes one or more reference frames of the respective layers, and wherein the reference index of the first layer is an invalid reference index for the second layer when the number of reference frames in the reference index of the first layer is not equal to the number of reference frames in the reference index of the second layer.

23. The method of claim 20, wherein determining valid reference information for the corresponding block in the second layer comprises converting a bi-directional motion vector associated with the reference information of the first layer to a urn-directional motion vector, wherein the bi-directional motion vector includes at least one reference index that is invalid for the corresponding block in the second layer.

24. The method of claim 20, wherein determining valid reference information for the corresponding block in the second layer comprises marking one or more urn-directional motion vectors associated with the reference information of the first layer as unavailable.

25. The method of claim 18, wherein the reference information associated with the co-located block in the first layer includes one or more first layer reference lists, and one or more first layer reference frames associated with each of the one or more first layer reference lists, and wherein the reference information associated with second layer includes one or more second layer reference frames, and wherein determining whether the reference information associated with the co-located block in the first layer is invalid for the corresponding block in the second layer relative to the reference information associated with the second layer comprises:
determining that none of the one or more second layer reference frames has a picture order count (POC) value equal to at least one picture order count (POC) value associated with the one or more first layer reference frames in at least one of the one or more first layer reference lists.

26. The method of claim 20, wherein determining valid reference information for the corresponding block in the second layer comprises:
omitting one or more motion vectors associated with the reference information of the first layer from use for coding the second layer.

27. The method of claim 21, wherein determining valid reference information for the corresponding block in the second layer comprises:
converting a reference index associated with the reference information of the first layer into a valid reference index for the second layer by setting the first reference index value for the reference index associated with the reference information of the first layer to a valid predefined reference index value for the second layer.

28. The method of claim 21, wherein determining valid reference information for the corresponding block in the second layer comprises:
converting a reference index associated with the reference information of the first layer into a valid reference index for the second layer by setting the first reference index value for the reference index associated with the reference information of the first layer to zero or to a maximum reference index value for the reference index of the second layer.

29. The method of claim 25, wherein determining valid reference information for the corresponding block in the second layer comprises:
omitting one or more motion vectors associated with the reference information of the first layer from use for coding the second layer.

30. The method of claim 18, wherein determining valid reference information for the corresponding block in the second layer comprises:
evaluating one or more motion vectors associated with reference information of the second layer; and
deriving one or more motion vectors to be used for the second layer coding from the first layer using one or more of the evaluated motion vectors associated with the reference information of the second layer.

31. The method of claim 30, wherein deriving one or more motion vectors to be used for coding the second layer coding from the first layer further comprises scaling the one or more motion vectors from the first layer.

32. The method of claim 18, wherein the reference information of the first and second layers include reference information related to one or more reference frames of the respective layers, and wherein the number of reference frames in a reference index associated with the reference information of the first layer is equal to the number of reference frames for the second layer.

33. The method of claim 18, wherein the reference information of the first and second layers include reference information related to one or more reference frames of the respective layers, and wherein the one or more reference frames of the second layer comprise only the one or more reference frames of the first layer.

34. The method of claim 18, wherein the first layer is a base layer and the second layer is an enhancement layer.

35. An apparatus for coding video data, the apparatus comprising:
a memory unit configured to store video information associated with a first layer and a corresponding second layer, the video information including at least reference information associated with a co-located block in the first and reference information associated with a corresponding block in the second layer;
a processor operationally coupled to the memory, and configured to retrieve the video information from the memory and code the video information, the processor further configured to
determine whether the reference information associated with the co-located block in the first layer is invalid for the corresponding block in the second layer relative to the reference information associated with the second layer; and in response to determining that the reference information associated with the co-located block in the first layer is invalid for the corresponding block in the second layer, determine valid reference information for the corresponding block in the second layer.

36. The apparatus of claim 35 wherein the processor is further configured to:
in response to determining that the reference information associated with the co-located block in the first layer is valid relative to the reference information associated with the second layer, use at least some of the reference information associated with the co-located block in the first layer to code the corresponding block in the second layer according to a merge mode coding technique or an advanced motion vector prediction (AMVP) coding technique.

37. The apparatus of claim 35 wherein to determine whether the reference information associated with the co-located block in the first layer is invalid for the corresponding block in the second layer relative to the reference information associated with the second layer, the processor is further configured to:
determine whether a reference index associated with the reference information of the first layer is an invalid reference index for the second layer.

38. The apparatus of claim 37, wherein a reference index associated with the reference information of the first layer is determined to be an invalid reference index for the second layer when there is no reference frame in a reference frame list of the second layer corresponding to the reference index of the co-located block in the first layer.

39. The apparatus of claim 37, wherein the reference information of the respective first and second layers includes one or more reference frames of the respective layers, and wherein the reference index of the first layer is an invalid reference index for the second layer when the number of reference frames in the reference index of the first layer is not equal to the number of reference frames in the reference index of the second layer.

40. The apparatus of claim 37, wherein to determine valid reference information for the corresponding block in the second layer, the processor is further configured to convert a bi-directional motion vector associated with the reference information of the first layer to a uni-directional motion vector, wherein the bi-directional motion vector includes at least one reference index that is invalid for the corresponding block in the second layer.

41. The apparatus of claim 37, wherein to determine valid reference information for the corresponding block in the second layer com, the processor is further configured to mark one or more uni-directional motion vectors associated with the reference information of the first layer as unavailable.

42. The apparatus of claim 35, wherein the reference information associated with the co-located block in the first layer includes one or more first layer reference lists, and one or more first layer reference frames associated with each of the one or more first layer reference lists, and wherein the reference information associated with second layer includes one or more second layer reference frames, and wherein to determine whether the reference information associated with the co-located block in the first layer is invalid for the corresponding block in the second layer relative to the reference information associated with the second layer, the processor is further configured to:
determine that none of the one or more second layer reference frames has a picture order count (POC) value equal to at least one picture order count (POC) value associated with the one or more first layer reference frames in at least one of the one or more first layer reference lists.

43. The apparatus of claim 37, wherein to determine valid reference information for the corresponding block in the second layer, the processor is further configured to:
omit one or more motion vectors associated with the reference information of the first layer from use for coding the second layer.

44. The apparatus of claim 38, wherein to determine valid reference information for the corresponding block in the second layer, the processor is further configured to:
convert a reference index associated with the reference information of the first layer into a valid reference index for the second layer by setting the first reference index value for the reference index associated with the reference information of the first layer to a valid predefined reference index value for the second layer.

45. The apparatus of claim 38, wherein to determine valid reference information for the corresponding block in the second layer, the processor is further configured to:
convert a reference index associated with the reference information of the first layer into a valid reference index for the second layer by setting the first reference index value for the reference index associated with the reference information of the first layer to zero or to a maximum reference index value for the reference index of the second layer.

46. The apparatus of claim 42, wherein to determine valid reference information for the corresponding block in the second layer, the processor is further configured to:
omit one or more motion vectors associated with the reference information of the first layer from use for coding the second layer.

47. The apparatus of claim 35, wherein to determine valid reference information for the corresponding block in the second layer, the processor is further configured to:
evaluate one or more motion vectors associated with reference information of the second layer; and
derive one or more motion vectors to be used for the second layer coding from the first layer using one or more of the evaluated motion vectors associated with the reference information of the second layer.

48. The apparatus of claim 47, wherein to derive one or more motion vectors to be used for the second layer coding from the first layer, the processor is further configured to scale the one or more motion vectors from the first layer.

49. The apparatus of claim 35, wherein the reference information of the first and second layers include reference information related to one or more reference frames of the respective layers, and wherein the number of reference frames in a reference index associated with the reference information of the first layer is equal to the number of reference frames for the second layer.

50. The apparatus of claim 35, wherein the reference information of the first and second layers include reference information related to one or more reference frames of the respective layers, and wherein the one or more reference frames of the second layer comprise only the one or more reference frames of the first layer.

51. The apparatus of claim 35, wherein the first layer is a base layer and the second layer is an enhancement layer.

52. The apparatus of claim 35, wherein the processor is configured to encode the video information.

53. The apparatus of claim 35, wherein the processor is configured to decode the video information.

54. The apparatus of claim 35, wherein the apparatus is selected from the group consisting of a desktop computer, a notebook computer, a laptop computer, a tablet computer, a set-top boxes, a telephone handsets, a smart phone, a smart pad, a television, a camera, a display device, a digital media player, a video gaming console, and a video streaming device.

55. A non-transitory computer readable medium having stored thereon code that, when executed, causes an apparatus to:
   receive reference information associated with a co-located block in a first layer of the video data and reference information associated with a corresponding block in a second layer of the video data, and wherein the co-located block is located at a position in the first layer corresponding to a position of the corresponding block in the second layer;
   determine whether the reference information associated with the co-located block in the first layer is invalid for the corresponding block in the second layer relative to the reference information associated with the second layer; and
   in response to determining that the reference information associated with the co-located block in the first layer is invalid for the corresponding block in the second layer, determine valid reference information for the corresponding block in the second layer.

56. The non-transitory computer readable medium of claim 54, further comprising code that, when executed, causes an apparatus to determine whether the reference information associated with the co-located block in the first layer is invalid for the corresponding block in the second layer relative to the reference information associated with the second layer by determining whether a reference index associated with the reference information of the first layer is an invalid reference index for the second layer.

57. The non-transitory computer readable medium of claim 54, further comprising code that, when executed, causes an apparatus to determine valid reference information for the corresponding block in the second layer by converting a reference index associated with the reference information of the first layer into a valid reference index for the second layer by setting the first reference index value for the reference index associated with the reference information of the first layer to zero or to a maximum reference index value for the reference index of the second layer.

58. The non-transitory computer readable medium of claim 54, further comprising code that, when executed, causes an apparatus to determine valid reference information for the corresponding block in the second layer by omitting one or more motion vectors associated with the reference information of the first layer from use for coding the second layer.

59. A video coding device that codes video data, the video coding device comprising:
   means for receiving reference information associated with a co-located block in a first layer of the video data and reference information associated with a corresponding block in a second layer of the video data, and wherein the co- located block is located at a position in the first layer corresponding to a position of the corresponding block in the second layer;
   means for determining whether the reference information associated with the co-located block in the first layer is invalid for the corresponding block in the second layer relative to the reference information associated with the second layer; and
   means for, in response to determining that the reference information associated with the co-located block in the first layer is invalid for the corresponding block in the second layer, determining valid reference information for the corresponding block in the second layer.

60. The video coding device of claim 59, wherein means for determining whether the reference information associated with the co-located block in the first layer is invalid for the corresponding block in the second layer relative to the reference information associated with the second layer comprises:
   means for determining whether a reference index associated with the reference information of the first layer is an invalid reference index for the second layer.

61. The video coding device of claim 59, wherein means for determining valid reference information for the corresponding block in the second layer comprises:
   means for converting a bi-directional motion vector associated with the reference information of the first layer to a uni-directional motion vector, wherein the bi-directional motion vector includes at least one reference index that is invalid for the corresponding block in the second layer.

62. The video coding device of claim 59, wherein means for determining valid reference information for the corresponding block in the second layer comprises:
   means for converting a reference index associated with the reference information of the first layer into a valid reference index for the second layer by setting the first reference index value for the reference index associated with the reference information of the first layer to a valid predefined reference index value for the second layer.

* * * * *